(12) United States Patent
Ebisumoto et al.

(10) Patent No.: US 11,097,787 B2
(45) Date of Patent: Aug. 24, 2021

(54) LOWER VEHICLE-BODY STRUCTURE

(71) Applicant: MAZDA MOTOR CORPORATION, Hiroshima (JP)

(72) Inventors: Keisuke Ebisumoto, Hiroshima (JP); Hidenori Matsuoka, Hiroshima (JP); Hirotaka Natsume, Hiroshima (JP); Yuki Ikawa, Hiroshima (JP); Naohiko Kasaki, Aki-gun (JP); Yosuke Morikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 134 days.

(21) Appl. No.: 16/534,274

(22) Filed: Aug. 7, 2019

(65) Prior Publication Data
US 2020/0047818 A1    Feb. 13, 2020

(30) Foreign Application Priority Data

Aug. 13, 2018 (JP) .............................. JP2018-152428

(51) Int. Cl.
*B62D 25/20* (2006.01)
*B60R 13/08* (2006.01)

(52) U.S. Cl.
CPC .......... *B62D 25/2018* (2013.01); *B60R 13/08* (2013.01)

(58) Field of Classification Search
CPC ................ B62D 25/20; B62D 25/2018; B62D 25/2036; B60R 13/08; B60R 13/0861
USPC ............................... 296/187.08, 193.07, 204
See application file for complete search history.

(56) References Cited

U.S. PATENT DOCUMENTS

| 4,514,008 A | * | 4/1985 | Watanabe | ............ B60K 15/073 280/835 |
| 6,007,145 A | * | 12/1999 | Tezuka | ................... B62D 25/20 296/203.01 |
| 2008/0067089 A1 | * | 3/2008 | Zhu | ........................ B25C 5/1651 206/340 |

(Continued)

FOREIGN PATENT DOCUMENTS

| DE | 102016000364 A1 | 7/2016 |
| JP | 2018-012425 A | 1/2018 |

(Continued)

OTHER PUBLICATIONS

The extended European search report issued by the European Patent Office dated Jan. 13, 2020, which corresponds to European Patent Application No. 19190301.2-1009.

*Primary Examiner* — Gregory A Blankenship
(74) *Attorney, Agent, or Firm* — Studebaker & Brackett PC

(57) ABSTRACT

A lower vehicle-body structure allows miniaturization of an undercover and prevents an increase in minimum ground clearance. In the lower vehicle-body structure, a vehicle body floor includes step-up portions connected to a floor tunnel on opposite sides of the floor tunnel in a vehicle width direction at least in regions where first and second cross members are disposed on the vehicle body floor. The lower vehicle-body structure includes a mount member that faces the floor tunnel and connects the step-up portions on the opposite sides of the floor tunnel, and includes first and second undercovers that cover a lower side of the mount member so as to be continuous with a bottom surface of the vehicle body floor on outer sides of the step-up portions in the vehicle width direction.

15 Claims, 9 Drawing Sheets

(56) References Cited

U.S. PATENT DOCUMENTS

| | | | |
|---|---|---|---|
| 2010/0156146 A1* | 6/2010 | Matsuyama | B62D 25/2036 296/193.07 |
| 2015/0249240 A1* | 9/2015 | Hihara | B62D 21/157 180/68.5 |
| 2016/0207572 A1* | 7/2016 | Natsume | B62D 25/20 |
| 2017/0057549 A1 | 3/2017 | Saeki | |
| 2017/0217297 A1 | 8/2017 | Li | |
| 2019/0009661 A1* | 1/2019 | Okamura | H01M 50/20 |
| 2019/0154132 A1* | 5/2019 | Dunham | B62D 25/20 |
| 2019/0202286 A1* | 7/2019 | Natsume | B62D 25/20 |
| 2019/0217742 A1* | 7/2019 | Natsume | B60K 17/08 |
| 2019/0329827 A1* | 10/2019 | Soma | B60R 13/0876 |
| 2019/0382052 A1* | 12/2019 | Natsume | B62D 25/20 |
| 2019/0382053 A1* | 12/2019 | Natsume | B62D 27/02 |
| 2019/0382054 A1* | 12/2019 | Natsume | B62D 25/025 |
| 2020/0031399 A1* | 1/2020 | Matsuda | B62D 21/03 |
| 2020/0047818 A1* | 2/2020 | Ebisumoto | B62D 25/20 |
| 2020/0361542 A1* | 11/2020 | Matsuda | B62D 25/20 |
| 2021/0031839 A1* | 2/2021 | Yamagishi | B62D 27/02 |

FOREIGN PATENT DOCUMENTS

| | | | |
|---|---|---|---|
| WO | 2013053433 A1 | 4/2013 | |
| WO | WO 2016/060090 | * 4/2016 | B62D 25/20 |

* cited by examiner

LOWER VEHICLE-BODY STRUCTURE

BACKGROUND

Technical Field

The present disclosure relates to a lower vehicle-body structure of a vehicle, and more particularly to a lower vehicle-body structure having a center tunnel.

Background Art

In some types of vehicles such as FR (front engine rear drive) vehicles and 4WD (four-wheel drive) vehicles, a propeller shaft extending in a vehicle front-rear direction is provided in a power transmission path from a drive source to drive wheels. The propeller shaft is generally disposed in a floor tunnel provided in a middle of a vehicle body floor in a vehicle width direction. Further, in a vehicle including, for example, a so-called longitudinally mounted power train, at least part of a transmission may be disposed in a floor tunnel.

In order to improve aerodynamic performance of a vehicle, an undercover is provided on a floor lower surface to straighten airflow passing below the floor lower surface during traveling of the vehicle.

For example, Japanese Patent Laid-Open No. 2018-12425 discloses an undercover that covers a floor lower surface other than a floor tunnel.

However, in the conventional structure, the undercover covers the entire floor lower surface on opposite sides of the floor tunnel, and thus needs to cover a further lower part of a frame member provided on the floor lower surface. This limits minimum ground clearance of the vehicle.

If a floor lower surface including a floor tunnel part is to be flatly covered to further improve aerodynamic performance, a large undercover needs to be prepared to cover the entire floor lower surface. This requires an additional configuration to ensure mounting rigidity of the large undercover.

Floor lower surfaces other than a tunnel part may be flatly formed without an undercover. However, if a member connecting opposite ends of a floor tunnel is provided, such a connecting member is configured to connect the floor lower surfaces on opposite sides of the tunnel in terms of assemblability, and thus located below the floor surface, which still causes a problem of minimum ground clearance.

Thus, the present disclosure provides a lower vehicle-body structure that allows miniaturization of an undercover and prevents an increase in minimum ground clearance.

SUMMARY

Accordingly, a lower vehicle-body structure according to the present disclosure is configured as described below.

First, a lower vehicle-body structure according to a first aspect of the present application includes a vehicle body floor having a floor tunnel; and a cross member that connects the floor tunnel and a side sill. The vehicle body floor includes step-up portions connected to the floor tunnel on opposite sides of the floor tunnel in a vehicle width direction at least in a region where the cross member is disposed on the vehicle body floor. The lower vehicle-body structure includes a connecting member that faces the floor tunnel and connects the step-up portions on the opposite sides of the floor tunnel, and includes an undercover that covers a lower side of the connecting member so as to be continuous with a bottom surface of the vehicle body floor on outer sides of the step-up portions.

In the lower vehicle-body structure of a second aspect of the present application according to the first aspect, the undercover is secured to the connecting member.

In the lower vehicle-body structure of a third aspect of the present application according to the first or second aspect, the undercover has a groove extending in a front-rear direction.

In the lower vehicle-body structure of a fourth aspect of the present application according to the third aspect, the undercover and the connecting member are secured in the groove.

In the lower vehicle-body structure of a fifth aspect of the present application according to any one of the first to fourth aspects, the lower vehicle-body structure further includes members extending in the front-rear direction, the members being connected along the respective step-up portions.

In the lower vehicle-body structure of a sixth aspect of the present application according to any one of the first to fifth aspects, the step-up portions each include an upper step portion, a middle step portion, and a lower step portion, the connecting member connects the upper step portions, and the undercover covers between the lower step portions.

With the lower vehicle-body structure according to the first aspect, the connecting member connects the step-up portions on the opposite sides of the floor tunnel, and thus a connecting part can be located higher than a bottom surface of the vehicle body floor. Although the connecting member is covered with the undercover, locating the connecting part higher than the bottom surface of the vehicle body floor allows airflow below a lower surface of a vehicle body to be straightened without sacrificing minimum ground clearance. In addition, there is no need to provide the undercover in regions on the outer sides of the step-up portions in the vehicle width direction, thereby facilitating securing of the undercover. This can allow the use of a smaller-sized undercover and prevent an increase in minimum ground clearance.

With the lower vehicle-body structure according to the second aspect, mounting rigidity of the undercover can be ensured without lowering a position of the undercover. This can reduce vibration of the undercover.

With the lower vehicle-body structure according to the third aspect, the groove extending in the front-rear direction straightens the airflow passing below the undercover, thereby further improving aerodynamic performance.

With the lower vehicle-body structure according to the fourth aspect, the undercover and the connecting member are secured in the groove through which the airflow passes, thereby preventing the undercover from vibrating due to straightening of the airflow.

With the lower vehicle-body structure according to the fifth aspect, the members extending in the front-rear direction are connected to the step-up portions, thereby preventing the members extending in the front-rear direction from protruding downward of the vehicle body floor. This can ensure rigidity of the vehicle body floor and minimum ground clearance.

With the lower vehicle-body structure according to the sixth aspect, the step-up portions each include a three-step structure comprising the upper step portion, the middle step portion, and the lower step portion, thereby increasing rigidity. The connecting member connects the upper step portions, and thus the connecting member protruding downward can be housed in the undercover.

DETAILED DESCRIPTION

Figure 1:
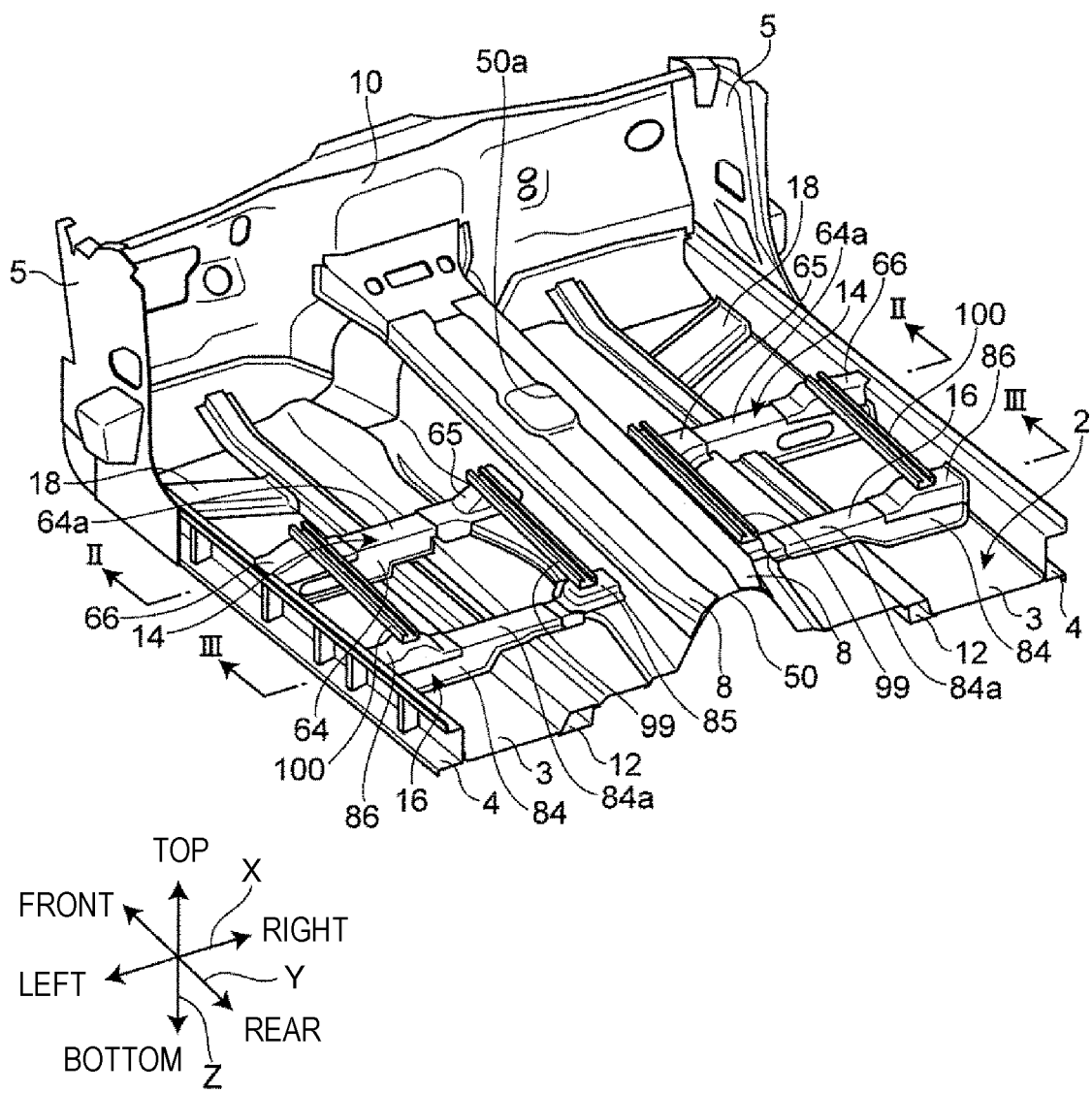
FIG. 1 is a perspective view of a lower vehicle-body structure according to an embodiment of the present disclosure.

Now, with reference to the accompanying drawings, a lower vehicle-body structure according to an embodiment of the present disclosure will be described. In the description below, terms indicating directions such as "front", "rear", "right", "left", "upper", and "lower" refer to directions with respect to a vehicle body in the case where a traveling direction of the vehicle traveling forward is defined as "front" unless otherwise specified. In the accompanying drawings, a vehicle width direction is denoted by a reference character "X", a vehicle front-rear direction is denoted by a reference character "Y", and a vehicle vertical direction is denoted by a reference character "Z".

Overall Configuration

Figure 2:
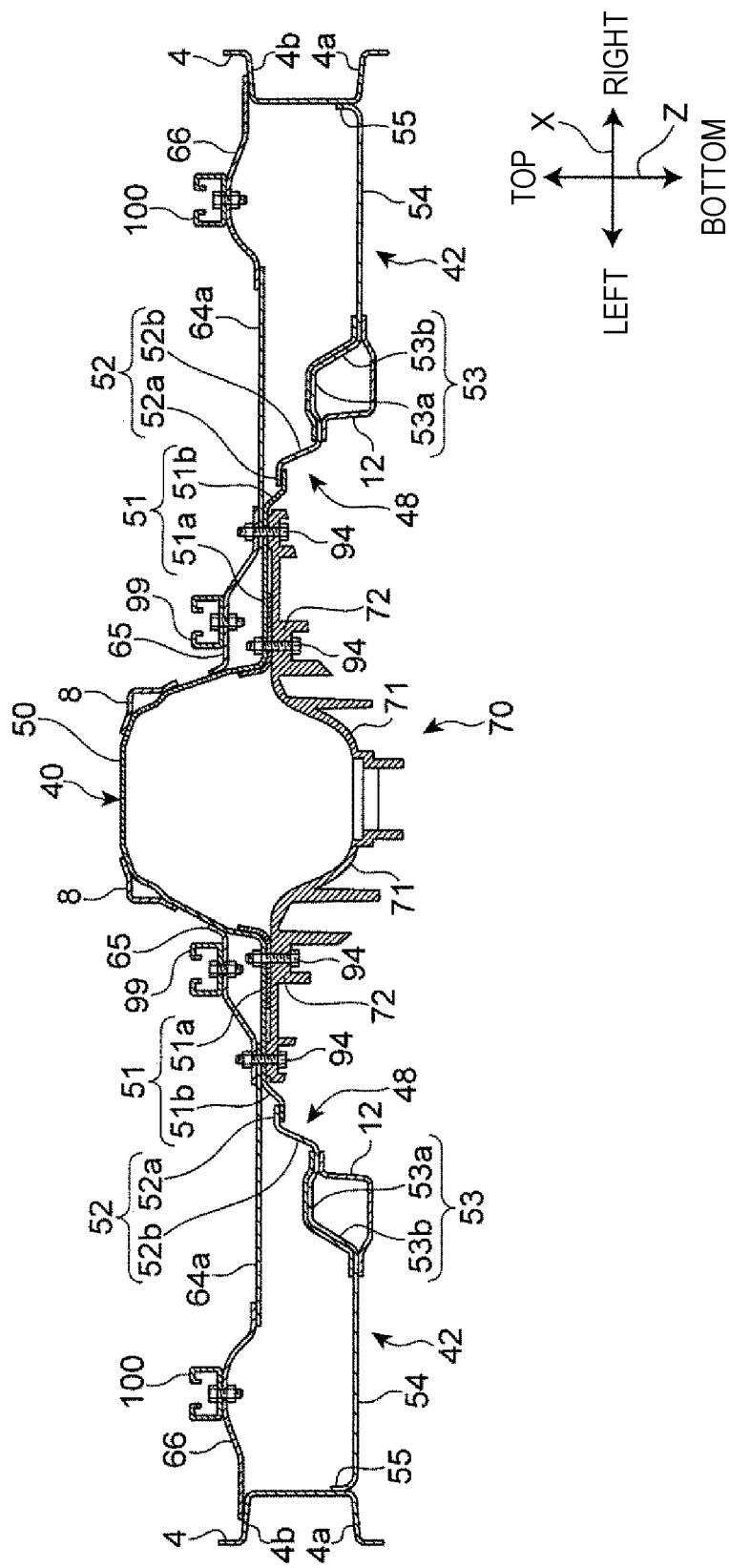
FIG. 2 is a sectional view of the lower vehicle-body structure taken along the line II-II in FIG. 1 and seen from a rear side of a vehicle.

As shown in a perspective view in FIG. 1 and a sectional view in FIG. 2, a vehicle 1 including a lower vehicle-body structure according to this embodiment includes a vehicle body floor 2 that constitutes a floor surface of a space in a vehicle interior, a pair of side sills 4 extending in the vehicle front-rear direction Y on opposite sides of the vehicle body floor 2 in the vehicle width direction X, and a dash panel 10 disposed on a front part of the vehicle body floor 2. Each of the side sills 4 has a hat-shaped section opening outward in the vehicle width direction X.

The vehicle 1 further includes a pair of hinge pillars 5 extending in the vehicle vertical direction Z from front ends of the left and right side sills 4 and, and the dash panel 10 is laid between the pair of hinge pillars 5. The dash panel 10 separates the space in the vehicle interior from an engine room ER in the vehicle front-rear direction Y.

The vehicle body floor 2 includes bottom surface portions 3 and a floor tunnel 50 expanding upward from the bottom surface portions 3. The floor tunnel 50 is provided to extend in the vehicle front-rear direction Y in a middle of the vehicle body floor 2 in the vehicle width direction X. The floor tunnel 50 has a U-shaped section opening downward when seen in the vehicle front-rear direction Y.

An upper surface portion of the floor tunnel 50 has an opening 50a through which a shift lever (not shown) is inserted. To opposite sides of the upper surface portion of the floor tunnel 50 in the vehicle width direction X, reinforcing members 8 extending in the vehicle front-rear direction Y are joined, for example, by welding, and thus increase rigidity of the floor tunnel 50.

To lower surfaces of the bottom surface portions 3 (step-up portions 48) of the vehicle body floor 2, a pair of left and right floor frames 12 extending in the vehicle front-rear direction Y are joined, for example, by welding. Each of the floor frames 12 is disposed between the floor tunnel 50 and a respective one of the side sills 4 in the vehicle width direction X. The floor frame 12 is connected to the front end of the side sill 4 via a torque box (not shown) extending in the vehicle width direction X.

To an upper surface of the vehicle body floor 2, floor cross members extending in the vehicle width direction X, particularly, a pair of left and right first cross members 14 and a pair of left and right second cross members 16, are joined. Each of the first cross members 14 and each of the second cross members 16 are disposed between the floor tunnel 50 and each of the side sills 4.

The left and right first cross members 14 are disposed substantially in the same position in the vehicle front-rear direction Y. The left and right second cross members 16 are disposed substantially in the same position in the vehicle front-rear direction Y on a rear side of the first cross members 14.

Each of the first cross members 14 includes a cross member body 64 extending in the vehicle width direction, and first and second seat brackets 65, 66 for supporting a pair of seat rails 99, 100 in a seat slide mechanism. The cross member body 64 and the first and second seat brackets 65, 66 are, for example, press-processed steel parts.

The cross member body 64 has a hat-shaped section opening downward, and forms a continuous closed section in the vehicle width direction X between the cross member body 64 and the vehicle body floor 2. An inner end of the cross member body 64 in the vehicle width direction X is located on an outer side of the floor tunnel 50 in the vehicle width direction X. The first seat bracket 65 is joined to the inner end of the cross member body 64 in the vehicle width direction X, and the first seat bracket 65 connects the cross member body 64 and the floor tunnel 50.

An outer end of the cross member body 64 in the vehicle width direction X is joined to one of the side sills 4. The second seat bracket 66 is joined to the outer end of the cross member body 64 in the vehicle width direction X and the side sill 4.

Further, to the upper surface of the vehicle body floor 2, a pair of left and right diagonal members 18 are joined, for example, by welding. Each of the diagonal members 18 is disposed on the front side of the first cross member 14 so as to be inclined inward and rearward in the vehicle width direction X. The diagonal member 18 is provided to connect the floor frame 12 and the side sill 4. The diagonal member 18 has a hat-shaped section opening downward, and forms a continuous closed section in a longitudinal direction of the diagonal member 18 between the diagonal member 18 and the vehicle body floor 2.

The vehicle 1 in this embodiment is an FR vehicle including, for example, a longitudinally mounted power train. The power train in the vehicle 1 includes an engine (not shown) as a drive source mounted in the engine room ER on a front side of the dash panel 10, and a transmission 24 (see FIG. 9) connected to a rear part of the engine.

The transmission 24 is, for example, a longitudinally mounted automatic transmission, and includes an output shaft (not shown) extending in the vehicle front-rear direction Y. The transmission 24 may be a manual transmission. A rear end of the output shaft of the transmission 24 is connected via a universal joint (not shown) to a propeller shaft 30 extending in the vehicle front-rear direction Y (see FIG. 4). A rear end of the propeller shaft 30 is connected to a differential gear 32. Thus, power of the engine can be transmitted via the transmission 24, the propeller shaft 30, the differential gear 32, and the like to rear wheels. The differential gear 32 is a heating element that generates heat by a friction force due to transmission of the engine power.

The propeller shaft 30 is disposed in the floor tunnel 50. The propeller shaft 30 is supported by a lower surface of the floor tunnel 50. In the floor tunnel 50, at least part of a rear end of the transmission 24 is also disposed.

A mount member 70 is secured to the vehicle body floor 2 in a position overlapping an upper surface portion 64a of the first cross member 14 in the vehicle front-rear direction Y. Thus, a rear part of the transmission 24 is supported by the vehicle body via the mount member 70. A front part of the transmission 24 is supported by the vehicle body, for example, a subframe 34 for a front suspension via the engine and an engine mount (not shown).

Vehicle Body Floor

With reference to the sectional view in FIG. 2, configurations of the vehicle body floor 2 in a position where the mount member 70 and the first cross member 14 are disposed in the vehicle front-rear direction Y and its surroundings will be described.

As shown in FIG. 2, the vehicle body floor 2 includes a tunnel panel 40 that constitutes the floor tunnel 50, and a pair of left and right bottom surface panels 42 that constitute the bottom surface portions 3. The tunnel panel 40 is disposed in the middle in the vehicle width direction X between the left and right side sills 4. The bottom surface panels 42 are provided to connect the tunnel panel 40 and the side sills 4.

The tunnel panel 40 and the bottom surface panel 42 are, for example, press-processed steel parts. The tunnel panel 40 preferably has higher rigidity and strength than the bottom surface panel 42, and thus increases rigidity and strength of the floor tunnel 50.

The vehicle body floor 2 includes the pair of step-up portions 48 connecting a bottom plate portion 54 that is a bottom of the bottom surface portion 3 and a lower edge of the floor tunnel 50. The step-up portions 48 extend from lower parts toward the opposite sides of the floor tunnel 50, and are connected to the floor tunnel 50 on the opposite sides thereof in the vehicle width direction at least in regions where the first and second cross members 14, 16 are disposed on the vehicle body floor 2.

Each of the step-up portions 48 includes an upper step portion 51, a middle step portion 52, and a lower step portion 53. In this embodiment, the step-up portion 48 has a three-step structure, thereby increasing rigidity. The step-up portion 48 may include less than or more than three steps. The step-up portion 48 does not need to be stepped, but may have, for example, an inclined structure.

The upper step portion 51 is provided to extend in the vehicle front-rear direction Y along the lower edge of the floor tunnel 50 from the front side of the first cross member 14 toward the rear side of the second cross member 16 (see FIG. 1).

As such, the upper step portion 51 is provided between the bottom surface portion 3 of the vehicle body floor 2 and the lower edge of the floor tunnel 50, thereby increasing rigidity in a boundary between the lower edge of the floor tunnel 50 and the bottom surface portion 3 without providing a separate reinforcing member.

As shown in FIG. 2, the upper step portion 51 includes a lateral plate portion 51a extending outward in the vehicle width direction X from the lower end of the floor tunnel 50, and a first inclined portion 51b extending outward in the vehicle width direction X from an outer end of the lateral plate portion 51a so as to be inclined downward. The first inclined portion 51b may extend vertically downward.

As such, the upper step portion 51 integral with the vehicle body floor 2 is provided in the boundary between the bottom surface portion 3 and the lower edge of the floor tunnel 50, thereby increasing rigidity. This allows reinforcement along the lower edge of the floor tunnel 50 in a region where the upper step portion 51 is provided in the vehicle front-rear direction Y without a reinforcing member separate from the vehicle body floor 2.

In this embodiment, the lateral plate portion 51a and the first inclined portion 51b of the upper step portion 51 are constituted by part of the tunnel panel 40. The tunnel panel 40 further includes an extending portion 51c extending outward in the vehicle width direction X from a lower end of the first inclined portion 51b. The extending portion 51c is joined to the bottom surface panel 42, for example, by welding.

However, the upper step portion 51 may be constituted by part of the bottom surface panel 42, or a floor forming member different from the tunnel panel 40 and the bottom surface panel 42.

Figure 3:
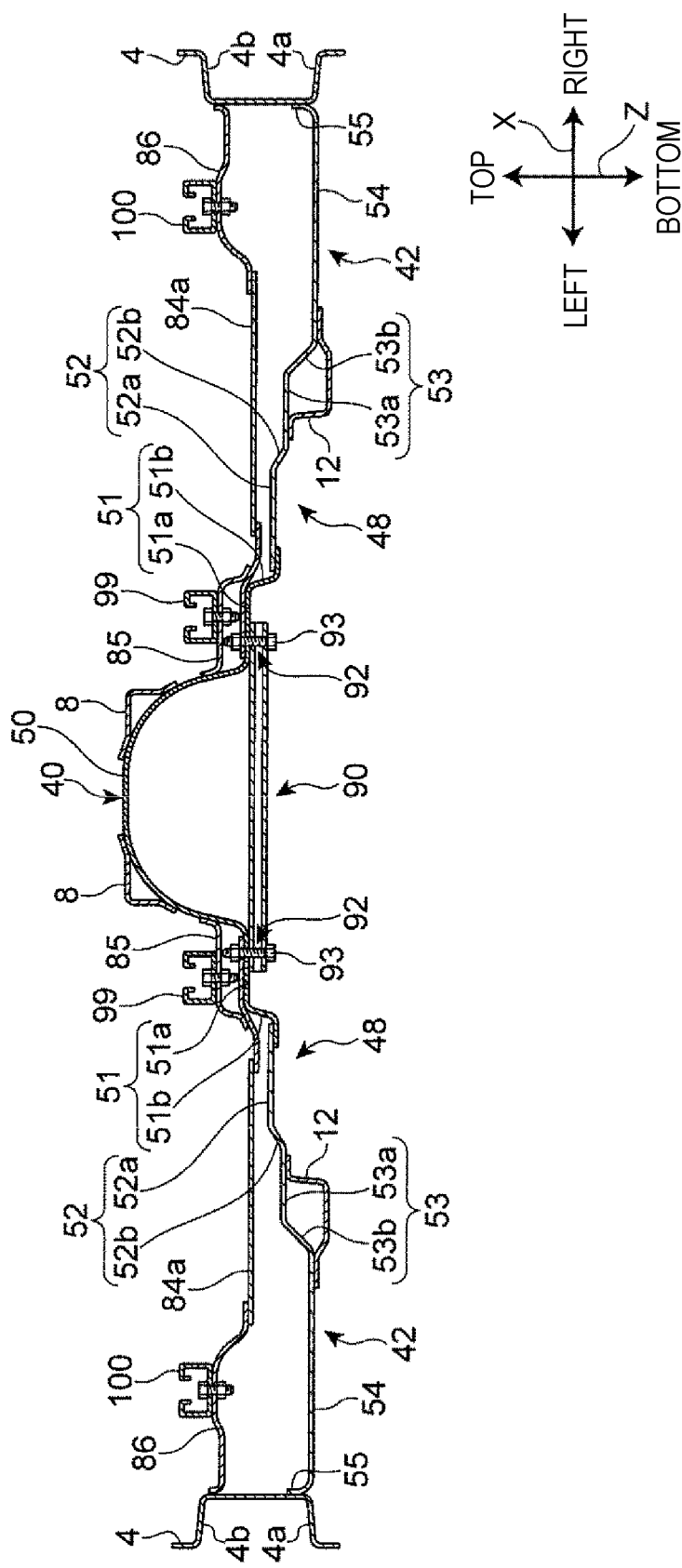
FIG. 3 is a sectional view of the lower vehicle-body structure taken along the line III-III in FIG. 1 and seen from the rear side of the vehicle.

As shown in FIG. 3, the middle step portion 52 includes a lateral plate portion 52a extending in the vehicle width direction X, and a second inclined portion 52b extending outward in the vehicle width direction X from an outer end of the lateral plate portion 52a so as to be inclined downward. The lateral plate portion 52a of the middle step portion 52 is joined to an upper surface of the extending portion 51c of the tunnel panel 40. Thus, an inner end of the lateral plate portion 52a of the middle step portion 52 in the vehicle width direction X is connected via the extending portion 51c to the lower end of the first inclined portion of the upper step portion 51.

As shown in FIG. 2, the lower step portion 53 includes a lateral plate portion 53a extending outward in the vehicle width direction X from a lower end of the second inclined portion 52b of the middle step portion 52, and a third inclined portion 53b extending outward in the vehicle width direction X from an outer end of the lateral plate portion 53a so as to be inclined upward.

A lower end of the third inclined portion 53b of the lower step portion 53 is connected to an inner end of the bottom plate portion 54 in the vehicle width direction X. A portion to be joined 55 is provided to extend upward from an outer end of the bottom plate portion 54. The portion to be joined 55 is joined to a side surface of one of the side sills 4 inside the vehicle interior, for example, by welding.

As such, the bottom plate portion 54 is disposed substantially at the same height as a bottom 4a of the side sill 4 in the vehicle vertical direction Z. The bottom plate portion 54 functions as an undercover of the vehicle 1, and is located at the same height as the bottom 4*a* of the side sill 4, thereby allowing ground clearance to be maintained on the opposite sides.

The sectional shape of the vehicle body floor 2 taken along the line II-II in FIG. 1 is not limited to that shown in FIG. 2, but may be changed. For example, the middle step portion 52 may include a plurality of steps or may be omitted. In this embodiment, the bottom plate portion 54 is located substantially at the same height as the portion to be joined 55, but may be located in a position higher than the portion to be joined 55.

The floor frame 12 is connected along the step-up portion 48. The floor frame 12 extending in the front-rear direction is connected to the step-up portion 48, thereby preventing the floor frame 12 extending in the front-rear direction from protruding downward of the vehicle body floor 2. This can ensure rigidity of the vehicle body floor 2 and minimum ground clearance.

The first seat bracket 65 is joined, at an inner end in the vehicle width direction X, to an outer side surface of the floor tunnel 50, for example, by welding, and joined, at an outer end in the vehicle width direction X, to the upper surface portion 64*a* of the cross member body 64, for example, by welding. Thus, the upper surface portion 64*a* of the cross member body 64 is connected via the first seat bracket 65 to the floor tunnel 50.

An inner end of the second seat bracket 66 in the vehicle width direction X is joined to the upper surface portion 64*a* of the cross member body 64, for example, by welding. An outer end of the second seat bracket 66 in the vehicle width direction X is joined to an upper surface portion 4*b* of the side sill 4, for example, by welding.

The mount member 70 that supports the transmission 24 is, for example, a cast component of aluminum alloy. The mount member 70 is a connecting member that faces the floor tunnel 50 and connects the step-up portions 48 on the opposite sides of the floor tunnel 50. The mount member 70 includes a base 71 extending in the vehicle width direction X. The base 71 has a butterfly-like general shape when seen in the vehicle vertical direction Z. The base 71 is curved to expand downward of the vehicle when seen in the vehicle front-rear direction Y.

Opposite ends of the base 71 in the vehicle width direction X are portions to be secured 72 that are secured to the vehicle body floor 2. Each of the portions to be secured 72 has a plurality of bolt holes extending through the portion to be secured 72 in the vehicle vertical direction Z. The portion to be secured 72 is secured to the upper step portion 51 of the vehicle body floor 2 as well as the cross member body 64 and the first seat bracket 65 arranged to overlap the upper side of the upper step portion 51 using bolts 94 inserted through the bolt holes. Thus, the mount member 70 connects the upper step portions 51.

With reference to FIG. 3, the second cross member 16 includes a cross member body 84 extending in the vehicle width direction, and first and second seat brackets 85, 86 for supporting the pair of seat rails 99, 100 in the seat slide mechanism. The cross member body 84 and the first and second seat brackets 85, 86 are, for example, press-processed steel parts.

The cross member body 84 and the first and second seat brackets 85, 86 of the second cross member 16 correspond to the cross member body 64 and the first and second seat brackets 65, 66 of the first cross member 14, and similarly function. Thus, detailed descriptions thereof are omitted.

A third cross member 90 has a plate-like general shape extending in the vehicle width direction X when seen in the vehicle vertical direction Z. Opposite ends of the third cross member 90 in the vehicle width direction X are portions to be secured 92 that are secured to the vehicle body floor 2. Each of the portions to be secured 92 has a plurality of bolt holes extending through the portion to be secured 92 in the vehicle vertical direction Z. The portion to be secured 92 is secured to the upper step portion 51 of the vehicle body floor 2 as well as the cross member body 84 arranged to overlap the upper side of the upper step portion 51 using bolts 93 inserted through the bolt holes.

Undercover

Figure 4:
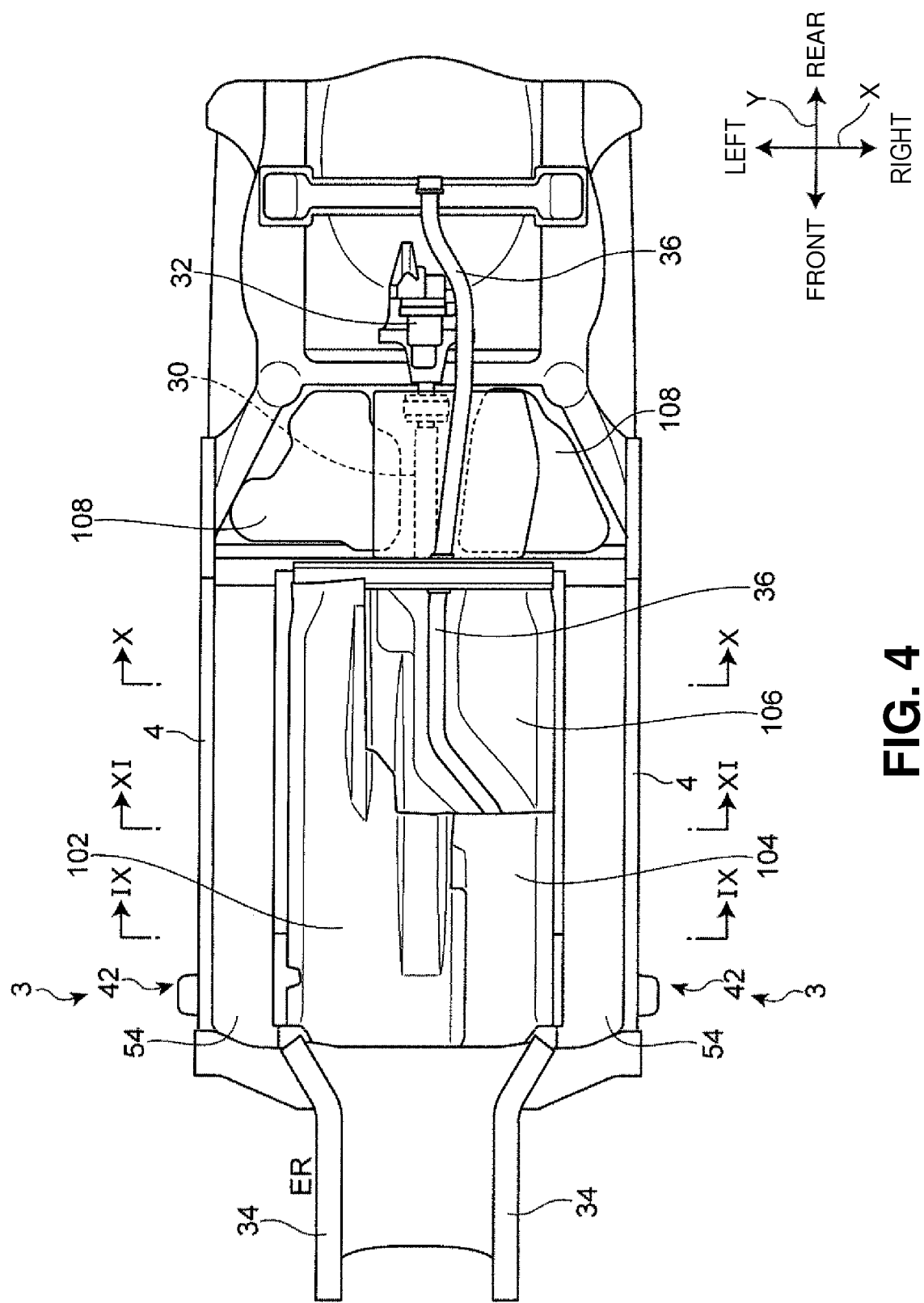
FIG. 4 is a bottom view of the lower vehicle-body structure to which a cover is secured.
Figure 5:
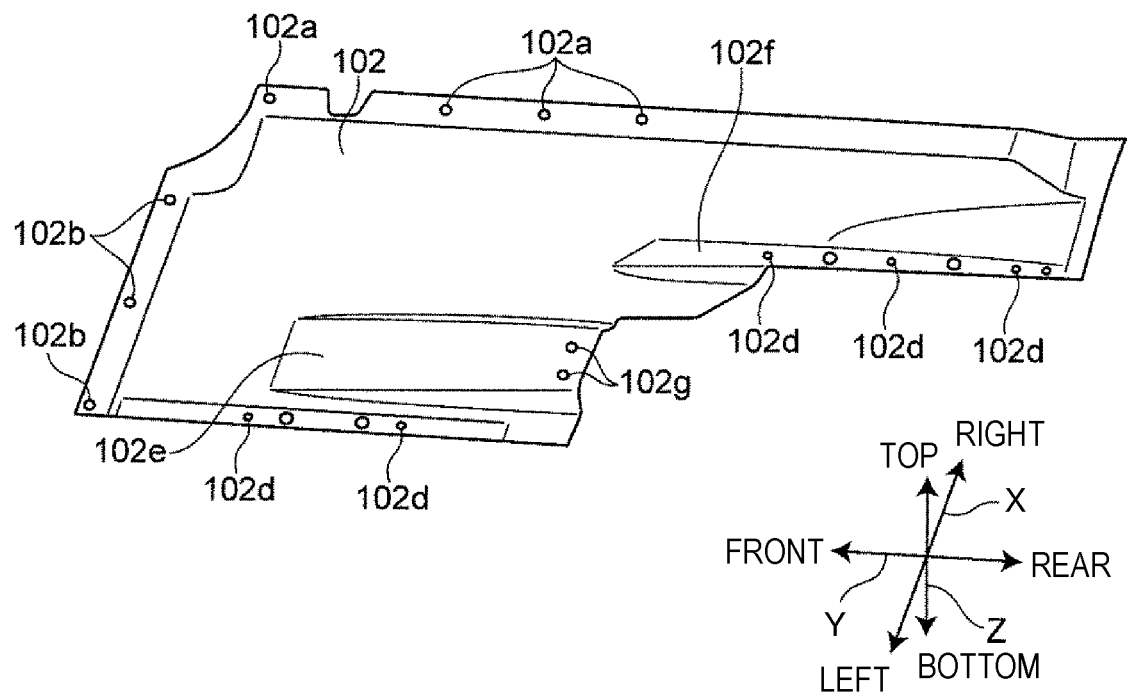
FIG. 5 is a schematic plan view of a first under panel seen from below a vehicle body.
Figure 6:
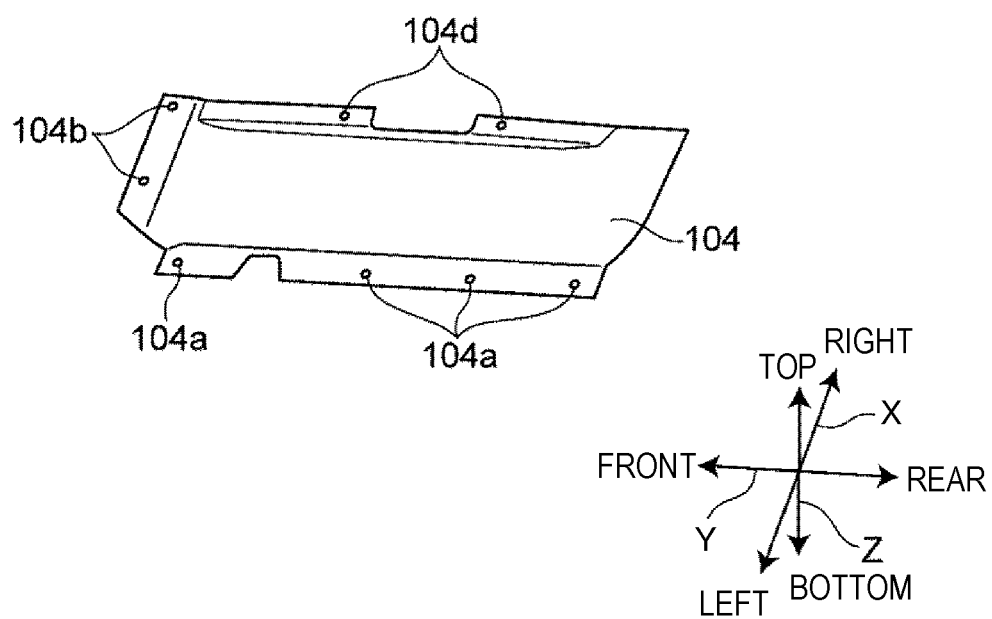
FIG. 6 is a schematic plan view of a second under panel seen from below the vehicle body.
Figure 7:
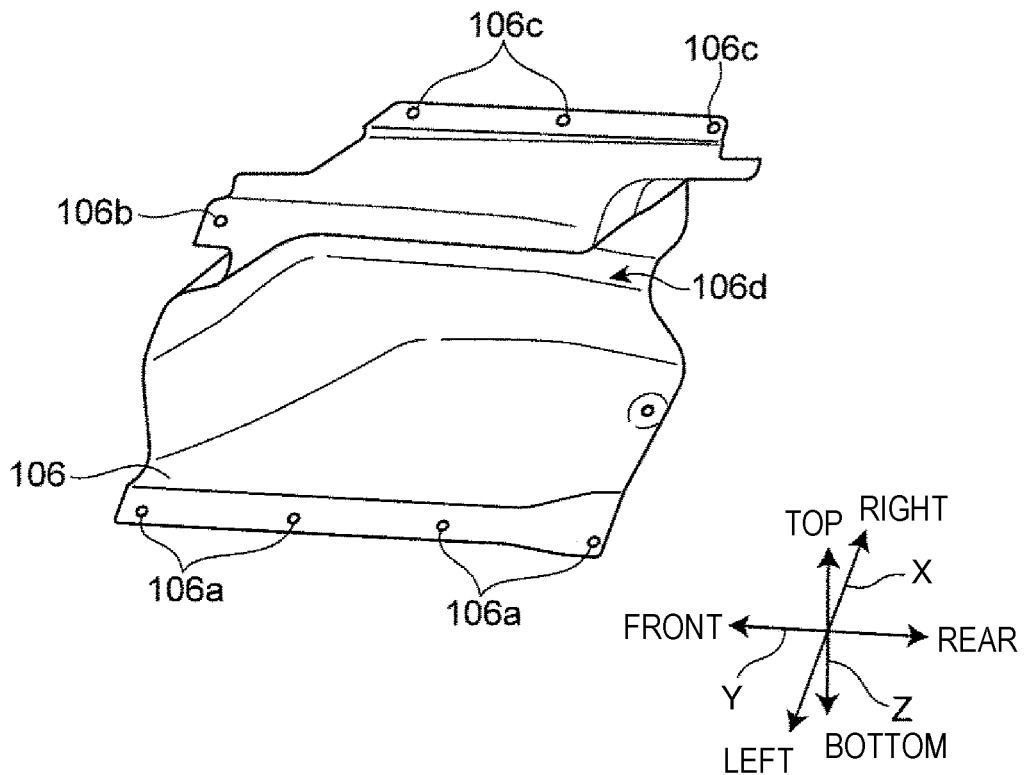
FIG. 7 is a schematic plan view of an insulator seen from below the vehicle body.

Next, with reference to a bottom view in FIG. 4 and perspective views in FIGS. 5, 6, and 7, first and second undercovers 102, 104 and a first insulator 106 mounted to the vehicle body floor 2 will be descried. The first and second undercovers 102, 104 cover a lower side of the mount member 70 so as to be continuous with the bottom plate portions 54 of the vehicle body floor 2 on outer sides of the step-up portions 48 in the vehicle width direction.

The first undercover 102 has a substantially L-shaped general shape. The first undercover has securing through holes 102*a*, 102*b*, 102*d* along an outer peripheral edge thereof. The first undercover 102 also has grooves 102*e*, 102*f* extending in the front-rear direction. The grooves 102*e*, 102*f* open downward and extend in the front-rear direction. The grooves 102*e*, 102*f* extending in the front-rear direction straighten airflow passing below the first undercover 102, thereby further improving aerodynamic performance.

The second undercover 104 is formed so that a middle in the vehicle width direction X expands downward. The second undercover has, in its right edge, securing through holes 104*a*. The second undercover has, in its front edge, securing through holes 104*b*. The second undercover has, in its left edge, securing through holes 104*d*.

The first insulator 106 has securing through holes 106*a*, 106*b*, 106*c* along an outer peripheral edge thereof. The first insulator 106 includes a U-shaped tunnel 106*d* opening downward. The tunnel 106*d* extends in the front-rear direction. The tunnel 106*d* houses an exhaust pipe 36.

Figure 8:
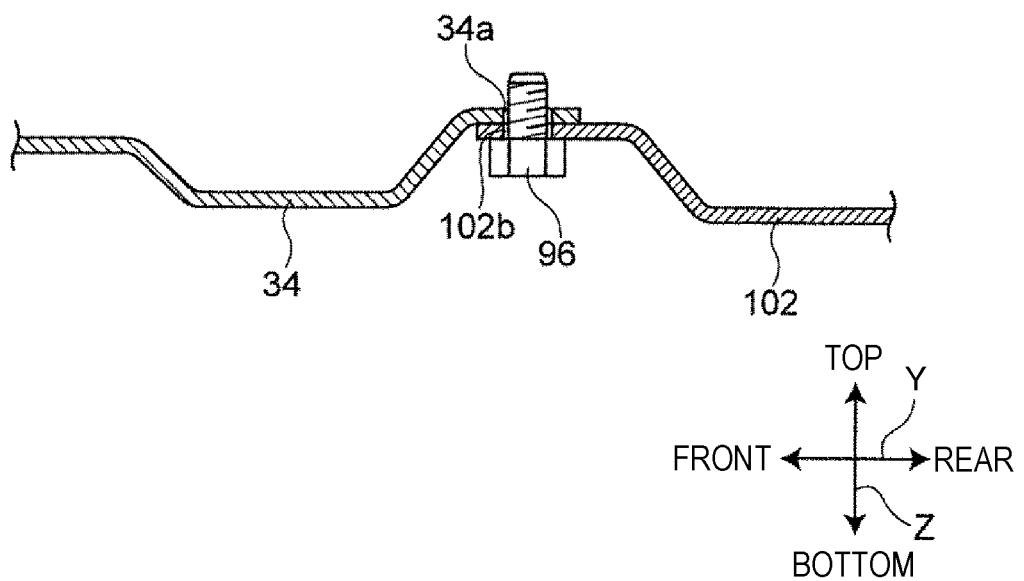
FIG. 8 is a sectional view of a joint between the first under panel and a subframe for a front suspension and its surroundings.

As shown in a sectional view in FIG. 8, the subframe 34 has, in its rear end, a through hole 34*a*. The through hole 102*a* in the first undercover 102 and the through hole 34*a* in the subframe 34 are secured, for example, by a fixture such as a bolt 96. Similarly, the through hole 104*b* in the second undercover 104 and the through hole 34*a* in the subframe 34 are secured, for example, by a fixture such as a bolt 96.

As such, lower surfaces of the subframes 34 are placed on and secured to upper surfaces of the first and second undercovers 102, 104. Front parts of the first and second undercovers 102, 104 are secured to overlap the subframes 34 for a front suspension, and thus a larger amount of outside air taken through a front grille into the engine room ER can be introduced onto the first and second undercovers 102, 104.

Figure 9:
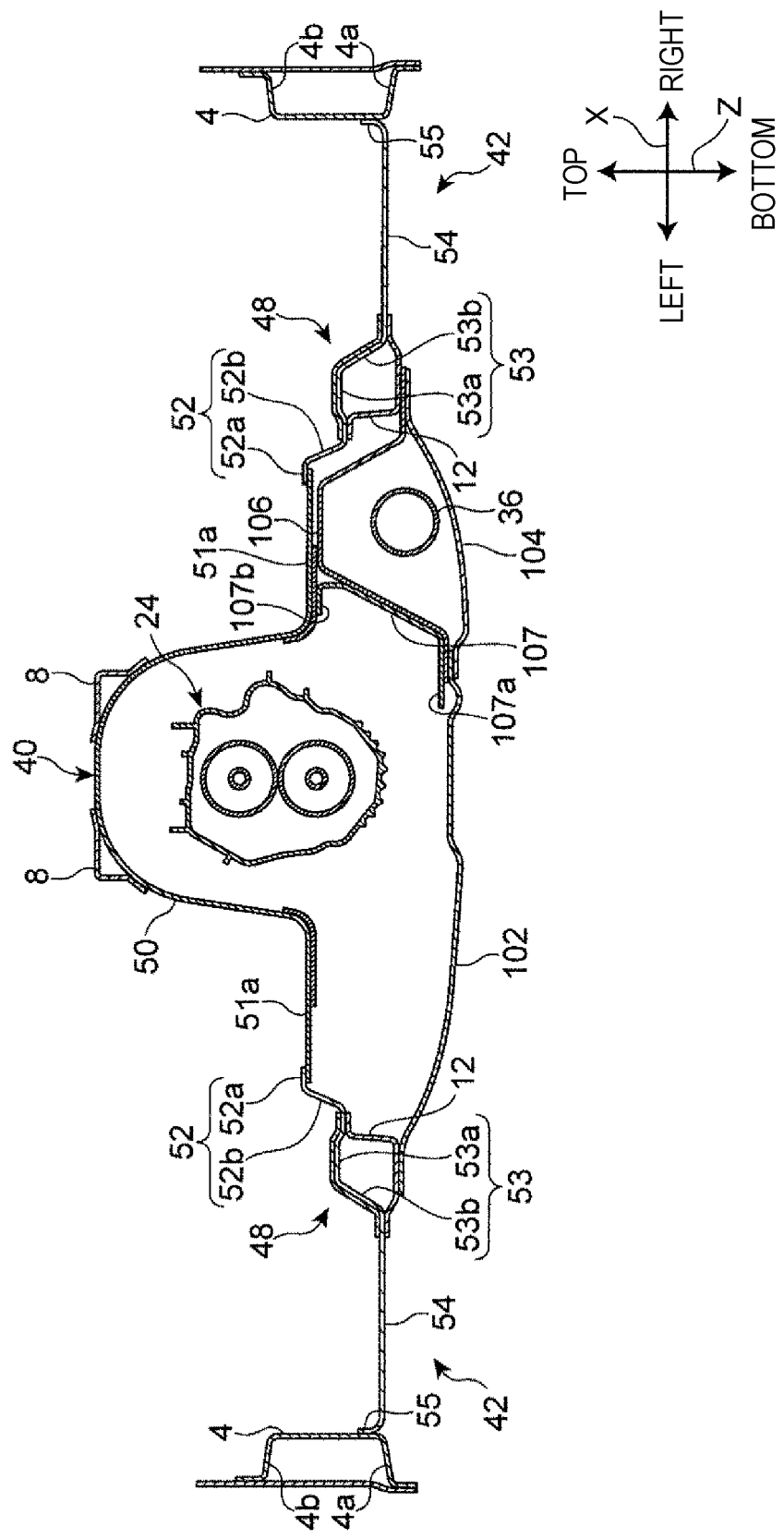
FIG. 9 is a sectional view of the lower vehicle-body structure taken along the line IX-IX in FIG. 4 and seen from a front side of the vehicle.

As shown in a sectional view in FIG. 9, the first and second undercovers 102, 104 are secured to the bottom surface panel 42 via a U-shaped bracket 107. The first and second undercovers 102, 104 are secured to a lower end 107*a* of the bracket 107 by a bolt being inserted through the through hole 102*d* in the first undercover 102 and the through hole 104*d* in the second undercover 104. The first insulator 106 is also secured via the bracket 107 to the bottom surface panel 42. The first insulator 106 is secured to the lower end of the bracket 107 by a bolt being inserted through the through hole 106*b*. An upper end 107*b* of the bracket 107 is secured to the lateral plate portion 51*a* extending from the tunnel panel 40.

Figure 10:
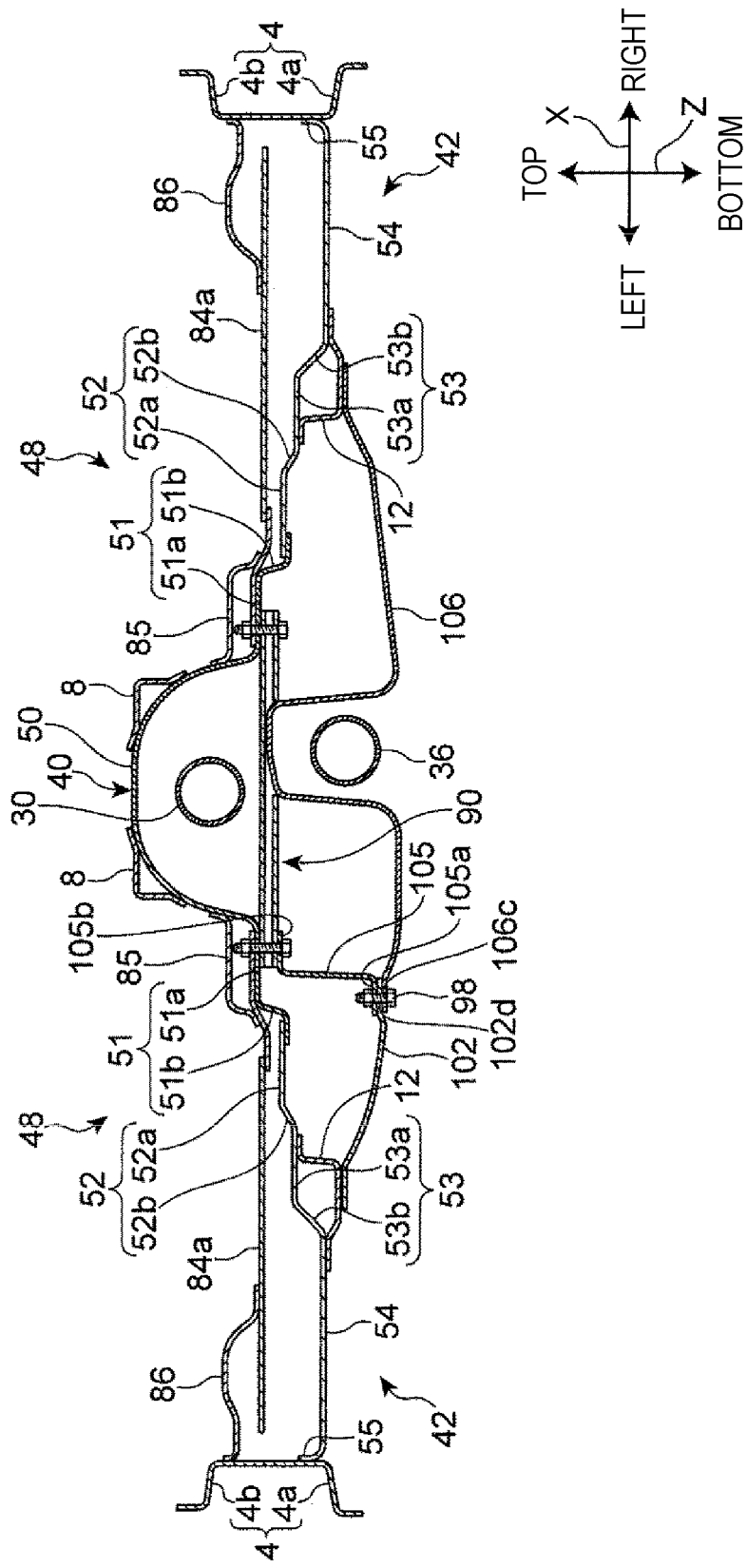
FIG. 10 is a sectional view of the lower vehicle-body structure taken along the line X-X in FIG. 4 and seen from the front side of the vehicle.

As shown in a sectional view in FIG. 10, the first undercover 102 and the first insulator 106 are secured via a Z-shaped bracket 105 to the third cross member 90 and the bottom surface panel 42. The first undercover 102 and the first insulator 106 are secured to a lower end 105*a* of the bracket 105 by a bolt 98 being inserted through the through hole 102*d* in the first undercover 102 and the through hole 106*c* in the first insulator 106. An upper end 105*b* of the bracket 105 is secured to the third cross member 90 and the upper step portion 51 of the bottom surface panel 42, for example, by a fixture such as a bolt.

Figure 11:
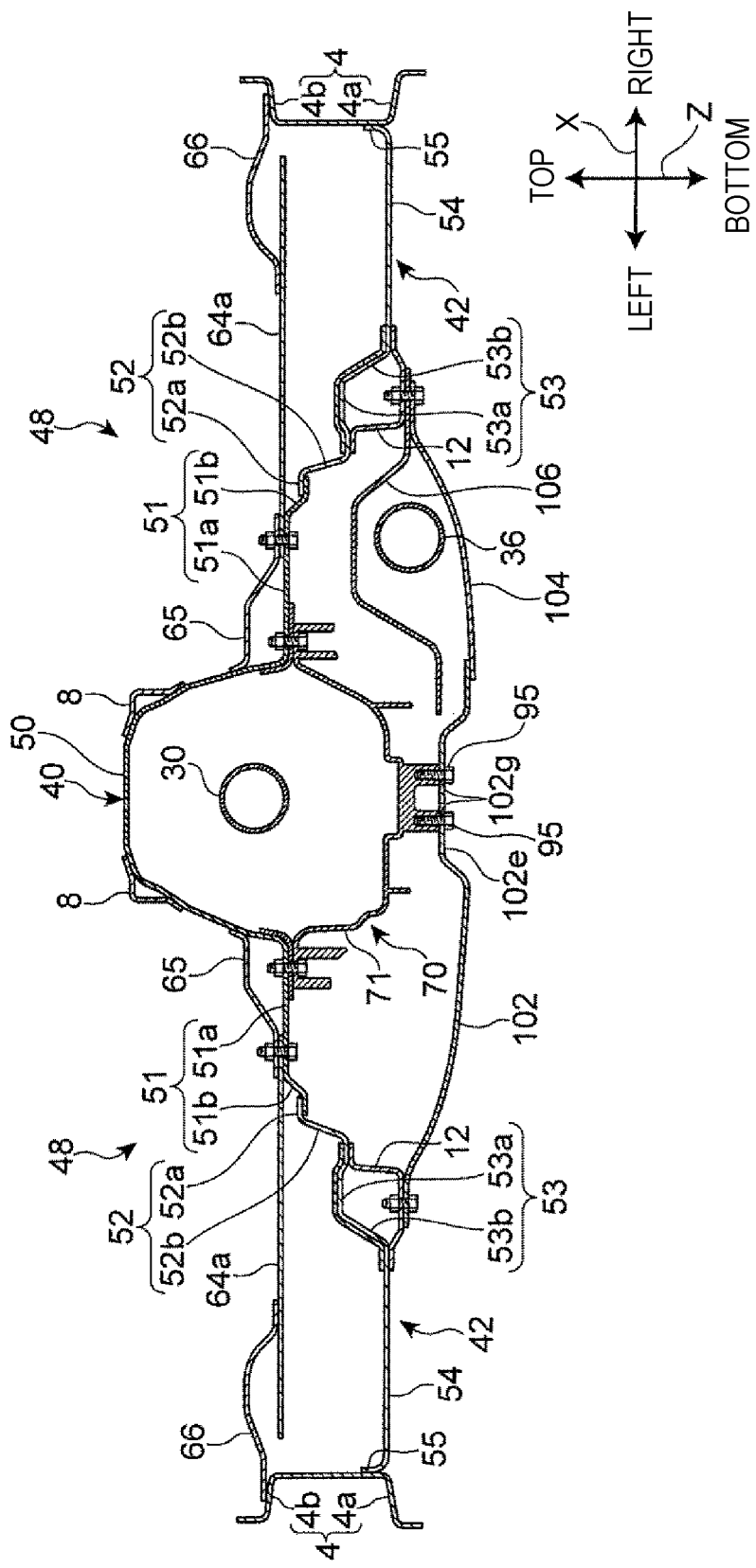
FIG. 11 is a sectional view of the lower vehicle-body structure taken along the line XI-XI in FIG. 4 and seen from the front side of the vehicle.

As shown in a sectional view in FIG. 11, the first undercover 102 is secured to the mount member 70 by a bolt 95 being inserted through a through hole 102*g* in the groove 102*e*. The first undercover 102 is secured to the mount member 70, and thus mounting rigidity of the first undercover 102 can be ensured without lowering a position of the first undercover 102. This can reduce vibration of the first undercover 102.

In addition, the first undercover 102 and the mount member 70 are secured in the groove 102*e* in the first undercover 102 through which the airflow passes, thereby preventing the first undercover 102 from vibrating due to straightening of the airflow.

A left edge of the first undercover 102 is secured to the floor frame 12 extending in the front-rear direction, for example, by a bolt being inserted through the through hole 102*d*. A right edge of the second undercover 104 is also secured to the floor frame 12 extending in the front-rear direction, for example, by a bolt being inserted through the through hole 104*a*. The floor frame 12 is secured to the lower step portion 53, and thus the first and second undercovers 102, 104 cover between the lower step portions 53. The mount member 70 connects the upper step portions 51, and thus the mount member 70 protruding downward can be housed in the first and second undercovers 102, 104.

The present disclosure has been described with the embodiment, but is not limited to the embodiment.

For example, in the embodiment, the example of the lower vehicle-body structure including the two undercovers, the first undercover 102 and the second undercover 104 has been described, but not limited to this. The present disclosure may be applied to a structure in which the first undercover 102 and the second undercover 104 are integrated or formed as two or more undercovers.

As described above, according to the present disclosure, the lower vehicle-body structure including the undercover on the floor lower surface can allow miniaturization of the undercover and prevent an increase in minimum ground clearance. Thus, the present disclosure can be suitably used in manufacturing and industrial fields of vehicles including such an undercover.

What is claimed is:

1. A lower vehicle-body structure comprising:
a vehicle body floor having a floor tunnel; and
a cross member that connects the floor tunnel and a side sill,
wherein
the vehicle body floor includes step-up portions connected to the floor tunnel on opposite sides of the floor tunnel in a vehicle width direction at least in a region where the cross member is disposed on the vehicle body floor,
the lower vehicle-body structure includes a connecting member that faces the floor tunnel and connects the step-up portions on the opposite sides of the floor tunnel, and includes an undercover that covers a lower side of the connecting member so as to be continuous with a bottom surface of the vehicle body floor on outer sides of the step-up portions in the vehicle width direction,
the connecting member includes a base extending in the vehicle width direction, and the base is curved to expand downward of the vehicle, wherein the curved to expand downward portion of the base expands to a position lower than a position of the cross member in the vertical direction of the vehicle, when seen in the vehicle front-rear direction, and
the undercover is secured to the expanded downward portion of the base of the connecting member.

2. The lower vehicle-body structure according to claim 1, wherein the undercover is secured to the connecting member.

3. The lower vehicle-body structure according to claim 1, wherein the undercover has a groove extending in a front-rear direction.

4. The lower vehicle-body structure according to claim 2, wherein the undercover has a groove extending in a front-rear direction.

5. The lower vehicle-body structure according to claim 3, wherein the undercover and the connecting member are secured in the groove.

6. The lower vehicle-body structure according to claim 4, wherein the undercover and the connecting member are secured in the groove.

7. The lower vehicle-body structure according to claim 1, further comprising members extending in the front-rear direction, the members being connected along the respective step-up portions.

8. The lower vehicle-body structure according to claim 1, wherein
the step-up portions each include an upper step portion, a middle step portion, and a lower step portion,
the connecting member connects the upper step portions, and
the undercover covers between the lower step portions.

9. The lower vehicle-body structure according to claim 1, wherein
the connecting member is a mount member that supports a transmission.

10. The lower vehicle-body structure according to claim 1, wherein
the undercover is configured to a first undercover and a second undercover, wherein
the first undercover has grooves extending in the front-rear direction, wherein the grooves open downward and extend in the front-rear direction, and
the second undercover is formed so that a middle in the vehicle width direction expands downward.

11. The lower vehicle-body structure according to claim 9, wherein
the undercover is configured to a first undercover and a second undercover, wherein
the first undercover has grooves extending in the front-rear direction, wherein the grooves open downward and extend in the front-rear direction, and
the second undercover is formed so that a middle in the vehicle width direction expands downward.

12. The lower vehicle-body structure according to claim 10, wherein
the first and second undercovers cover a lower side of the mount member so as to be continuous with the bottom plate portions of the vehicle body floor on outer sides of the step-up portions in the vehicle width direction.

13. The lower vehicle-body structure according to claim 10, wherein
lower surfaces of subframes for a front suspension are placed on and secured to upper surfaces of the first and second undercovers.

14. The lower vehicle-body structure according to claim 11, wherein
the first undercover is secured to the mount member by a bolt being inserted through a through hole in the groove.

15. The lower vehicle-body structure according to claim 10, wherein
a propeller shaft is disposed in the floor tunnel, and the propeller shaft is supported by a lower surface of the floor tunnel, and in the floor tunnel, at least part of a rear end of a transmission is also disposed.

* * * * *